United States Patent [19]
Miura

[11] Patent Number: 5,930,505
[45] Date of Patent: Jul. 27, 1999

[54] METHOD FOR STORING A PROGRAM INTO AN AUXILIARY MEMORY

[75] Inventor: Takashi Miura, Hokkaido, Japan

[73] Assignee: Hudson Soft Co. Ltd., Hokkaido, Japan

[21] Appl. No.: 09/082,497

[22] Filed: May 21, 1998

Related U.S. Application Data

[63] Continuation of application No. 08/418,755, Apr. 7, 1995, abandoned, which is a continuation-in-part of application No. 07/990,468, Dec. 15, 1992, abandoned.

[30] Foreign Application Priority Data

Dec. 17, 1991 [JP] Japan .................................. 3-353438

[51] Int. Cl.⁶ ...................................................... G06F 9/45
[52] U.S. Cl. .......................................... 395/701; 395/705
[58] Field of Search .................................. 395/701, 702, 395/703, 705, 706; 711/101, 115

[56] References Cited

U.S. PATENT DOCUMENTS

| | | | |
|---|---|---|---|
| 3,643,225 | 2/1972 | Rice et al. ........................... | 340/172.5 |
| 4,692,858 | 9/1987 | Redford et al. ...................... | 364/200 |
| 5,050,088 | 9/1991 | Buckley et al. ..................... | 364/468 |
| 5,157,779 | 10/1992 | Washburn et al. .................. | 395/595 |
| 5,170,465 | 12/1992 | McKeeman et al. ............... | 395/700 |
| 5,179,703 | 1/1993 | Evans ................................. | 395/700 |
| 5,394,550 | 2/1995 | Sasaki et al. ........................ | 395/700 |
| 5,414,850 | 5/1995 | Whiting .............................. | 395/700 |
| 5,519,866 | 5/1996 | Lawrence et al. .................. | 395/700 |

OTHER PUBLICATIONS

Mick, Dan, "Circumventing DOS Program Memory Constraints With An Overlay Manager", Microsoft Systems Journal, v 4, N 4, pp. 1–16, Jul. 1989.

*Primary Examiner*—Tariq R. Hafiz
*Assistant Examiner*—Kakali Chaki
*Attorney, Agent, or Firm*—Laff, Whitesel & Saret, Ltd.

[57] ABSTRACT

Predetermined condition data are stored in an auxiliary memory. The condition data includes source information used for generating a complete program. A program structure file 4–9 generated in accordance with the condition data. A complete program is generated by using the program structure file. After the complete program has been executed, the program is erased while preserving the program structure file and a batch file.

9 Claims, 9 Drawing Sheets file A

← DATA FORMAT IS NECESSARY FOR GENERATING PROGRAM

← OPTIONS ARE NOT ALWAYS NECESSARY FOR GENERATING PROGRAM

FIG.8

| COLUMN | ITEM | WIDTH | TYPE | INPUT | DECIMAL POINT | COMMA | REFE-RENCE |
|---|---|---|---|---|---|---|---|
| A | DATE OF SALE | 10 | CHARA. | HALF | | | |
| B | CODE | 10 | CHARA. | HALF | | | |
| C | CLASS | 20 | CHARA. | WHOLE | | | YES |
| D | NAME | 20 | CHARA. | WHOLE | | | YES |
| E | MAKER | 20 | CHARA. | WHOLE | | | YES |
| F | STANDARD PRICE | 9 | NUMBER | HALF | 0 | YES | |
| G | PURCHASING PRICE | 9 | NUMBER | HALF | 0 | YES | |
| H | UNIT PRICE | 9 | NUMBER | HALF | 0 | NO | |
| I | QUANTITY | 3 | NUMBER | HALF | | YES | |
| J | SALE PRICE | 9 | FORMULA | | 0 | YES | |
| K | PROFIT | 9 | FORMULA | | | | |
| L | BUYER | 30 | CHARA. | WHOLE | | | YES |
| M | PERSON | 20 | CHARA. | WHOLE | | | |
| N | OTHERS | 60 | CHARA. | WHOLE | | | |
| O | | | | | | | |
| P | | | | | | | |
| Q | | | | | | | |

(1:1)
FILE TO BE EDITED :[UR]

FIG. 9

| ITEM | INPUT ORDER | COLOR DEFINITION | COLOR CHANGE | WHOLE DELETE | DELETE | MOVE | LINE | AUTO | SET |
|---|---|---|---|---|---|---|---|---|---|

```
DATE OF SALE     AAAAAAAAA
CODE             AAAAAAAAA
CLASS            AAAAAAAAAAAAAAAAAAAAAAAA
NAME             AAAAAAAAAAAAAAAAAAAAAAAA
MAKER            AAAAAAAAAAAAAAAAAAAAAAAA
STANDARD PRICE   NNNNNNNNN
UNIT             NNNNNNNNN
PRICE            NNNNNNNNN
QUANTITY         NNN
SALE PRICE       EEEEEEEEE
PROFIT           EEEEEEEEE
BUYER            AAAAAAAAAAAAAAAAAAAAAAAAAAAAAAAAAA
PERSON           AAAAAAAAAAAAAAAAAAAAAA
OTHERS           AAAAAAAAAAAAAAAAAAAAAAAAAAAAAAAAAAAAAAAAAAAAAAAAAAAAAAA
```

(6:15)
FILE TO BE EDITED :[UR]

FIG. 10

| PURCHASING UNIT PRICE | UNIT SALE PRICE | QUAN-TITY | SALE PRICE | PROFIT | BUYER | PERSON IN CHARGE | OTHERS |
|---|---|---|---|---|---|---|---|
| 190000 | 165000 | 10 | 1650000 | -250000 | COMPANY H | A | |
| 150000 | 153000 | 5 | 765000 | 15000 | COMPANY N | B | |
| 156000 | 179000 | 10 | 1790000 | 230000 | COMPANY B | A | |
| 170000 | 185000 | 2 | 370000 | 36000 | COMPANY R | C | |
| 150000 | 154000 | 35 | 5390000 | 140000 | CMPANY L | A | |
| 650000 | 730000 | 23 | 16790000 | 1840000 | COMPANY K | D | |
| 200000 | 243000 | 6 | 1458000 | 258000 | COMPANY G | A | |
| 150000 | 180000 | 10 | 1800000 | 300000 | COMPANY H | E | |
| 500000 | 550000 | 10 | 5500000 | 500000 | COMANY R | A | |
| 500000 | 600000 | 2 | 1200000 | 200000 | Ms.TANAKA | F | |
| 800000 | 850000 | 30 | 25500000 | 1500000 | COMPANY H | A | |
| 300000 | 350000 | 10 | 3500000 | 500000 | COMPANY S | G | |
| 740000 | 800000 | 1 | 800000 | 200000 | COMPANY N | H | |
| 500000 | 600000 | 60 | 36000000 | 6000000 | Mr.HINO | A | |
| 8800000 | 9000000 | 10 | 90000000 | 2000000 | COMPANY K | A | |
| 300000 | 350000 | 10 | 3500000 | 500000 | COMPANY S | A | |
| 500000 | 530000 | 15 | 7950000 | 450000 | COMPANY L | H | |
| 700000 | 650000 | 5 | 3250000 | -250000 | Ms.TANAKA | A | |
| 300000 | 310000 | 80 | 24800000 | 800000 | COMPANY H | G | |

METHOD FOR STORING A PROGRAM INTO AN AUXILIARY MEMORY

This is a contamination of Ser. No. 08/418,755 filed Apr. 7, 1995, now abandoned, which was a continuation in part of 07/990,468 filed Dec. 15, 1992 now abandoned.

FIELD OF THE INVENTION

The invention relates to a method for storing a program into an auxiliary memory, and more particularly to, a method for saving a memory which is in an auxiliary storing apparatus for a computer.

BACKGROUND OF THE INVENTION

These days, portable type, small computers have been widely used, wherein flexible or floppy disks, electronic cards, etc. are hereinafter called "auxiliary memories". A memory capacity of such a flexible disk, an electronic card, etc. is approximately 1M bytes.

In the operation of a computer, a program of a form which is hereinafter called a "conducting form" is read from an auxiliary memory and is loaded into a main memory of the computer.

However, the amount of program files which are stored in such an auxiliary memory having a capacity of 1M bytes is limited. For instance, even if a program is simple, it often needs 100 to 200 K bytes. In a simple calculation, only five to ten programs are stored in one flexible disk of 1M bytes.

In order to store program files as much as possible into an auxiliary memory, a program is comnpressed to save memory space in accordance with the replacement of repetitive data and the same data or simple data which reappears frequently. Such a compressed program file is developed to be restored in the form of an original program file which is practically used in a computer in response to using a "developing program". Otherwise, such a compressed program is directory extended and developed in a main memory of a computer in order to be run, carried out, or "conducted" in the computer.

In general, programs which are to be frequently used or which are grouped library are preferable to be stored in a common auxiliary memory. In case of using a computer such as a portable computer with which a large capacity of an auxiliary memory can not be utilized, the auxiliary memories must be replaced by each other, when a program to be conducted is changed.

In case of storing a program which is compressed, the program must be developed, when it is conducted. Otherwise, a particular computer in which a compressed program is conducted is required. In this case, however, the size of the compressed program is generally limited.

SUMMARY OF THE INVENTION

According, an object of the invention is to provide a method for storing a program into an auxiliary memory by which the number of programs is increased.

According to the invention, a method for storing program data in an auxiliary memory, includes the following steps:

(1) storing condition data in the auxiliary memory, the condition data comprising source information to be used for generating a complete program;

(2) generating a program structure file in accordance with the condition data stored in the auxiliary memory;

(3) generating a complete program by using the program structure file;

(4) executing the generated complete program; and (5) erasing the complete program when the execution thereof has been finished while preserving the program structure file.

BRIEF DESCRIPTION OF THE DRAWINGS

The invention will be explained in more detail in conjunction with the appended drawings, wherein:

FIG. 8 is an explanatory diagram showing a display example in a step of the invention.

FIG. 9 is an explanatory diagram showing a display example in another step of the invention.

FIG. 10 is an explanatory diagram showing a display example in another step of the invention.

DESCRIPTION OF THE PREFERRED EMBODIMENTS

Figure 1:
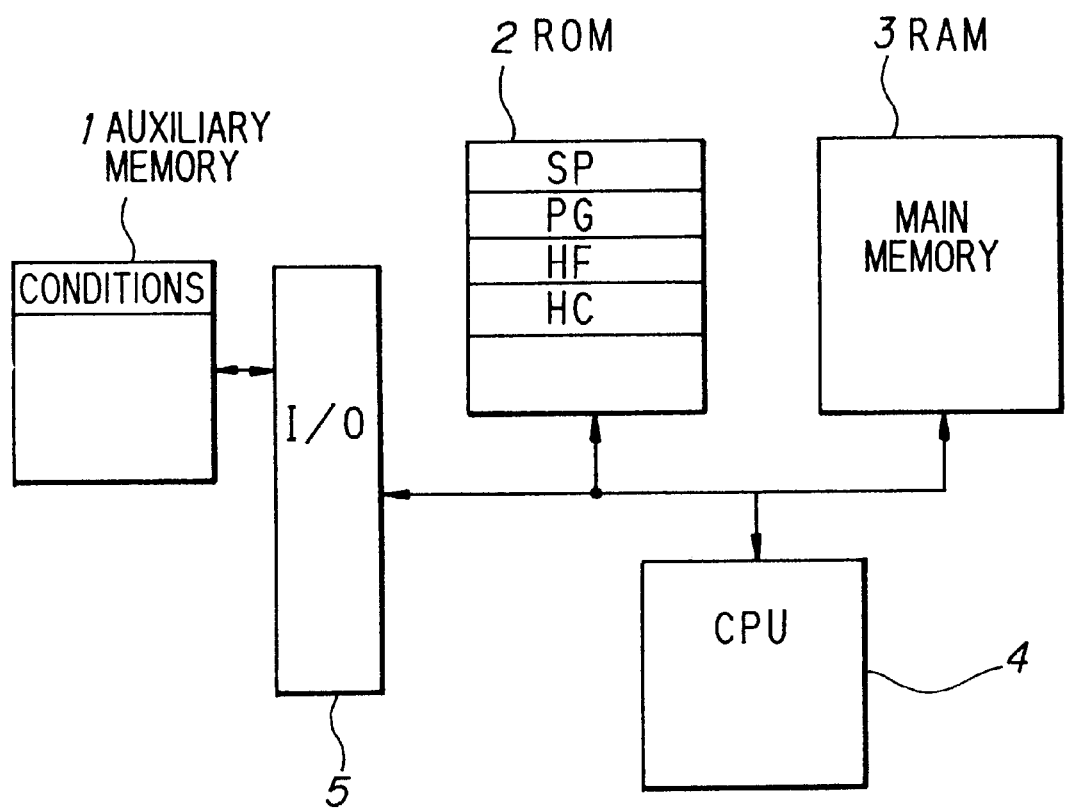
FIG. 1 is a block diagram illustrating a computer system to which a method according to the invention is applied.
Figure 2:
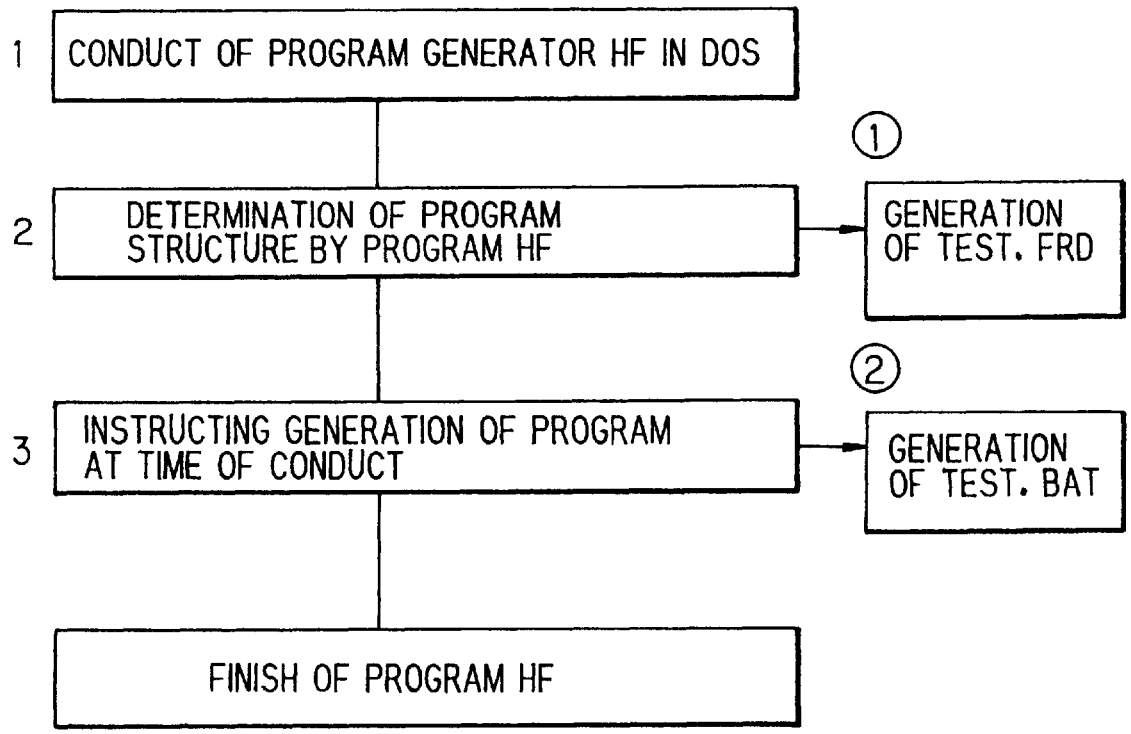
FIGS. 2 and 3 are flow charts showing the concept of the invention.
Figure 3:
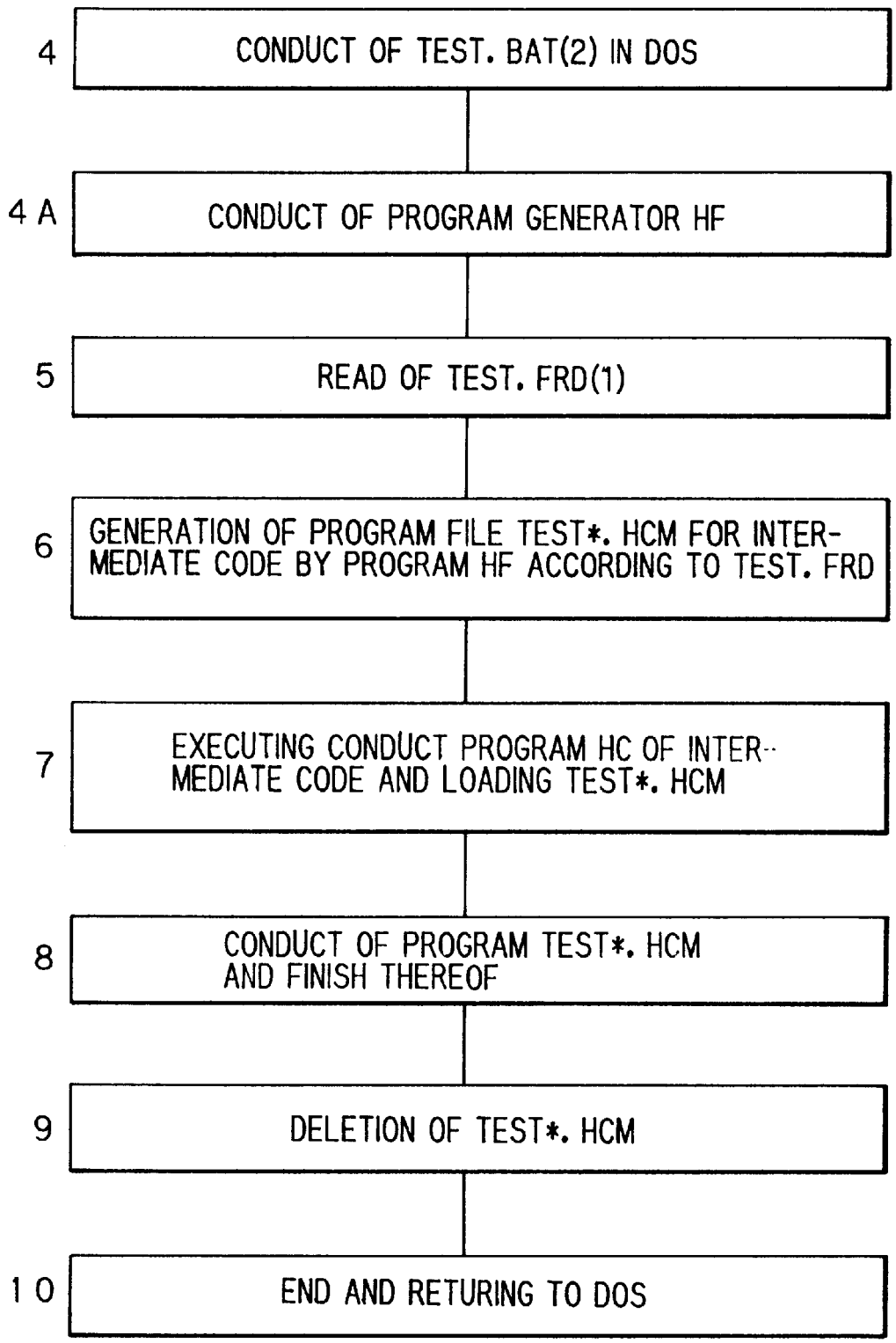
Figure 4:
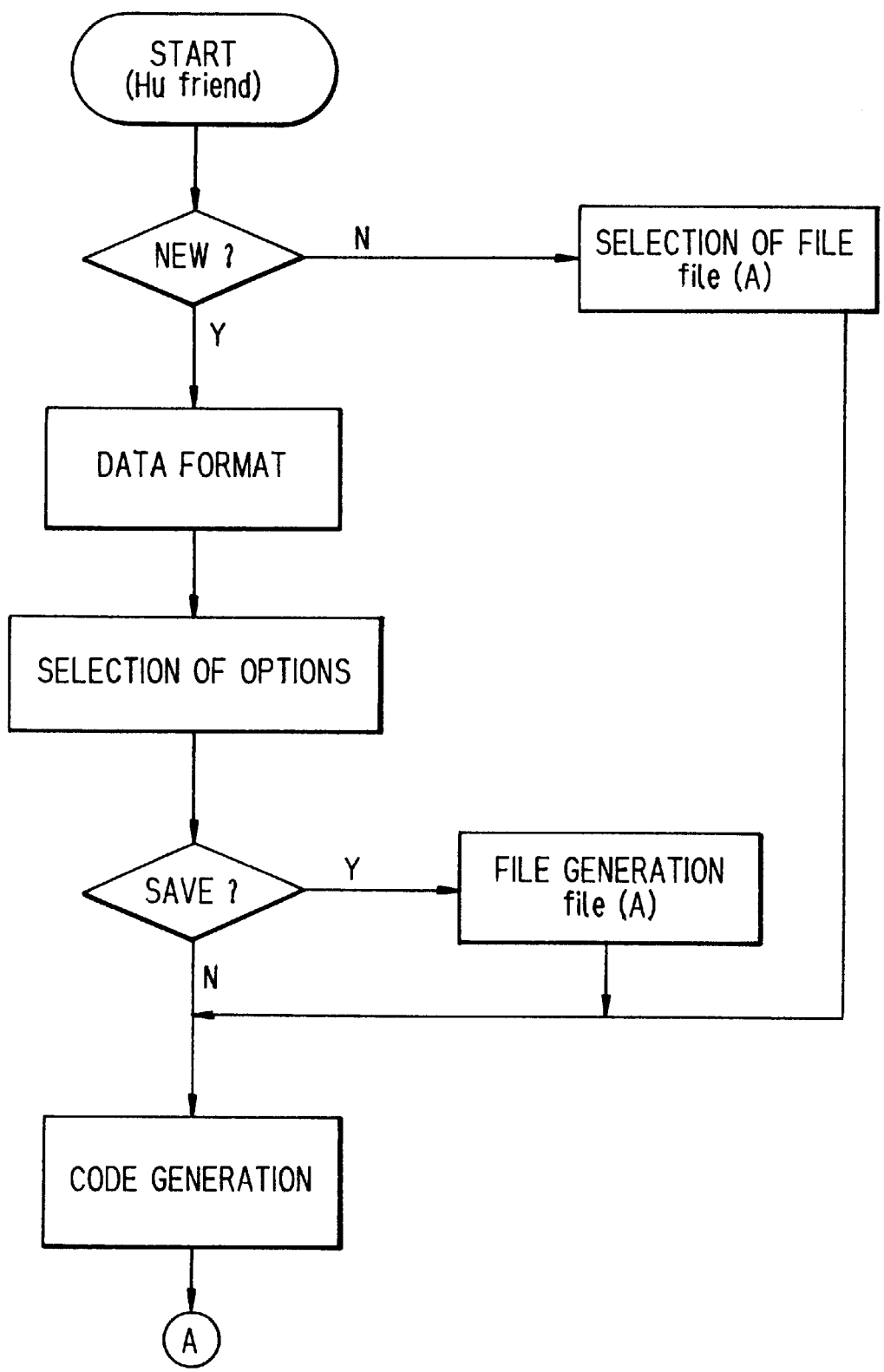
FIGS. 4 and 5 are flow charts showing the practical operation of the method according to the invention.
Figure 5:
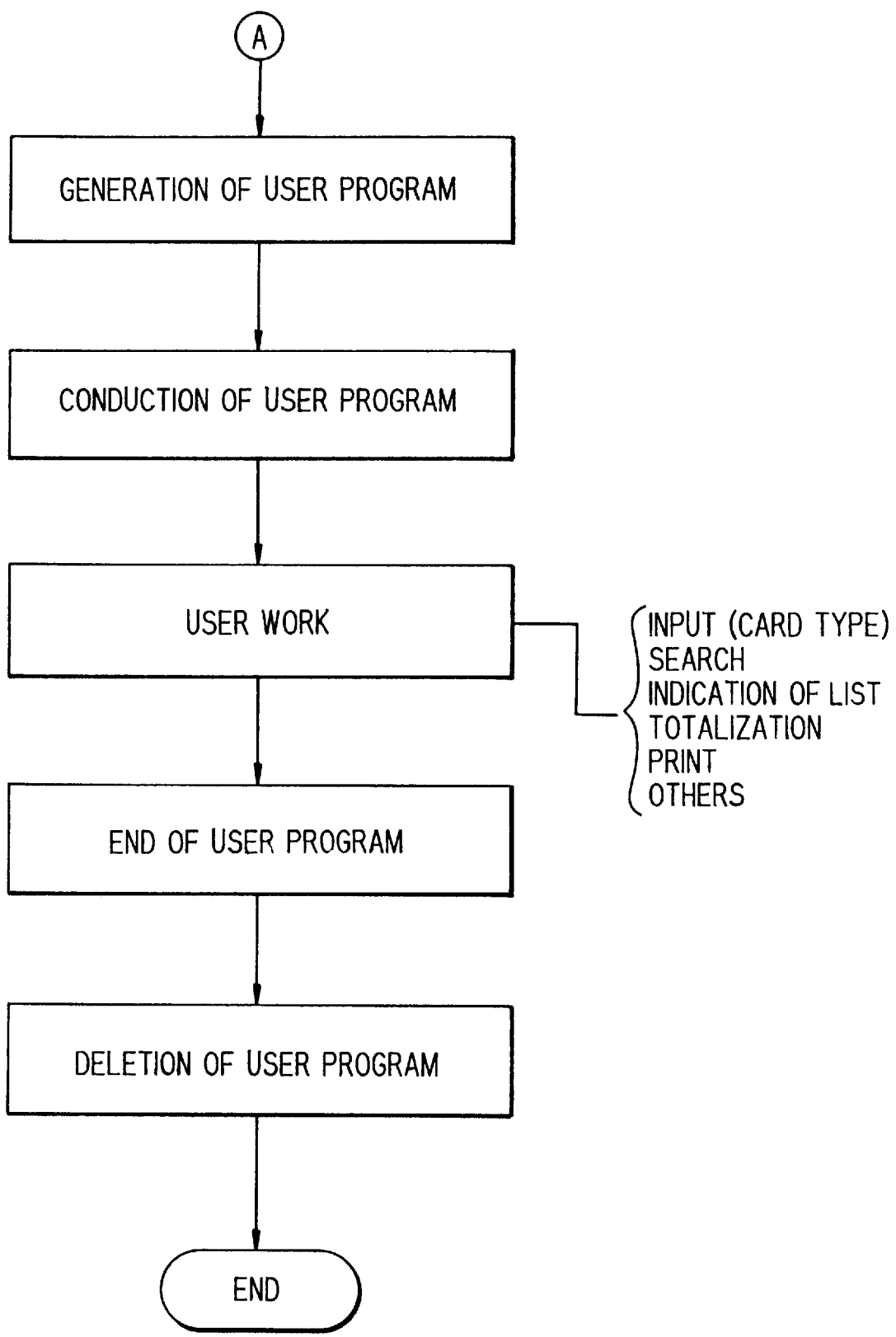
Figure 6:
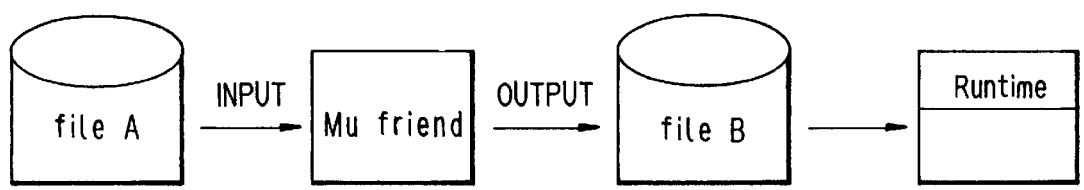
FIG. 6 is a block diagram illustrating a simplified structure of the invention.

FIG. 1 shows a computer system to which a method according to the invention is applied, including an auxiliary memory 1, a ROM (Read Only Memory) 2, a RAM (Random Access Memory) 3, a CPU (Central Processing Unit) 4 and an I/O unit 5. The auxiliary memory, which may be a flexible disk, an electric card or the like, stores condition data to be used for generating a complete program. The data stored in the auxiliary memory 1 are transmitted to the ROM 2 via the I/O unit 5. The CPU 4 controls the I/O unit 5, ROM 2 and RAM 3.

A method for storing a program into an auxiliary memory of the preferred embodiment will be explained.

In this preferred embodiment, a program HF provides for driving a program generator, a program HC for conducting a generated program, and a program for carrying out the administration of "peripheral" or systems.

The program HF has a definition function for defining a form of data and an input display, and an "additional function" for printing an item, reference, sorting, collective processing, etc. The function of generating a program is realized by the use of an intermediate code and the ASCII code, and by a batch file for conducting a procedure for generating a program by a quasi-generation function.

If the program HF is based on the intermediate code. The program HC is driven by conducting a batch file, or by a generated program which is conducted by designating a macroprogram. On the other hand, if the program HF is based on the ASCII code, a compilation can be made by an ordinary editor program. However, when the program is conducted, another "conducting program" is required.

A main program is generated for each item of the additional functions such as printing, reference, etc. in accordance with the form of data defined in a program structure file which is generated along with a batch file. The main program is deleted, when the conduct or running of the main program has been completed. The program structure file, the batch file, data file and data reference file are only preserved in a memory.

The total size of the preserved files is 5 to 10 K bytes. As compared to a preserved in a memory, information can be stored in the memory in an amount increased by ton to twenty times.

A method for storing a program into an auxiliary memory of the preferred embodiment, as briefly explained above, will be again explained in FIG. 1.

The driving program HF for driving a program generator is conducted by DOS (disk operating system).

The structure of a program is defined by the program HF. In this definition, the data input mode based on a data item, column width, form and data decimal point, comma, and presence and non-presence of reference data re designated. The data defined content is generated as a program structure file TEST. FRD. A program structure file TEST. FRD is also generated for the additional function such as input display, print, reference, sort, etc.

A form of a program is selected from the intermediate code, the ASCII code, and the generation of a program at the time of conducting the program. In this preferred embodiment, the generation of a program at the time of conducting the program is selected, so that a batch file TEST. BAT is generated.

On the other hand, if the intermediate code is selected, an intermediate code program is generated in accordance with a definition. A batch file to be conducted by DOS is generated. If the ASCII code is selected, an ASCII code program is generated. In these cases, the generated program is preserved, The batch file TEST. BAT comprises the generation of the intermediate code program, the conduct of the generated program by the conducting program HP, and the deletion of the generated program.

The batch file TEST. BAT is conducted.

The program HP reads the program structure file TEST. FRD generated at the step 2.

The program generator generates a program file based on intermediate code. At this step, a main menu program TEST. HCM is generated. If the additional function of a program structure definition is defined, an intermediate code program TEST*. HCM such as data input, data display, layout print, sight print, total print, reference, sort, collective processing, and reference master renewal is generated in accordance with the content thereof.

The program HC generates a driving program to read the intermediate code program TEST*. HCM.

The conduct of the intermediate code program TEST*. MCM has been carried out and finished.

The intermediate code program TEST*. HCM is erased or deleted from a memory.

The procedure returns to DOS.

Consequently, the program structure file TEST. FRD, the batch file TEST. BAT, the main data file TEST. HCD, and the main data reference file remain to be preserved in the memory. If there is a reference data, the reference data file TEST@M. HCD and the reference data reference file TEST@M. HCX remain to be preserved in the memory.

In this preferred embodiment, at most eleven programs of a batch file TEST. BAT, a program structure file TEST. FRD, a main menu program TEST. HCM, and at most eight intermediate code programs are generated to require a memory capacity of 200 K bytes. Advantageously, six files of the program structure file TEST. FRD, the batch file TEST. BAT, the main data file TEST. HCD, the main data reference file TEST. HCX, the reference file TEST@M. HCD, and the reference data reference file TEST@M. HCX are left to be preserved in the memory, so that only 10 K bytes memory capacity is required. Whenever a program is required to be conducted, the program HF for driving the program generator is conducted, so that the above six programs left in the memory are conducted to generate the program to be conducted.

As described above, a program generating condition file which stores conditions prescribed in generating a program by using a program generator is stored in an auxiliary memory. In conducting a program, the program is generated in accordance with the program generating condition file by the program generator. The generated program is developed in a vacant region of the auxiliary memory. The generated program may be directly developed in a main memory of a computer. The generated program may be intermediate code or machine word. The generated program is deleted from the memory, after the conduct of the generated program has finished.

Figure 7:
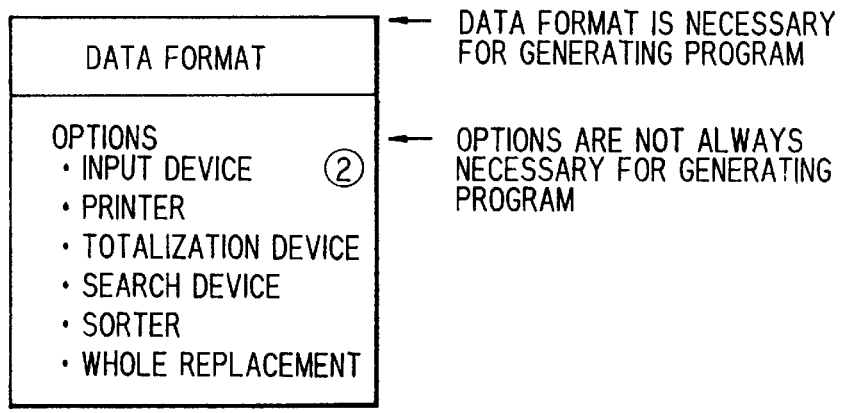
FIG. 7 is a conceptual diagram showing a data format used in the invention.

Next, an example of practical use according to the preferred embodiment is described in conjunction with FIGS. 4 through 10. First, if a program to be generated has been generated before, the corresponding file (A) is selected. Otherwise, a data format is produced, as shown in FIG. 8, and then options are selected to form a file (A) as shown in FIG. 7. In this stage, if the produced data format and options re not be stored, code generation is carried out. In accordance with the generated code, a user program is generated and executed. In the user program, a user inputs necessary information in the computer, as shown in FIG. 9. When the user has completed the input work, the computer calculate the input data to make a list shown in FIG. 10. When execution of the user program has been finished, the user program is deleted.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method of increasing a main memory capacity for a computer comprising:

a main memory which stores first data that is free of a complete source program; separate auxiliary memory; and an interface for coupling said separate auxiliary memory with said main memory;

said method comprising the steps of:

storing condition data in the auxiliary memory, the condition data comprising source information to be used for generating a complete object program;

generating a program structure file in accordance with the condition data stored in the auxiliary memory;

generating a complete object program in said computer by combining said first data and said condition data; and erasing the complete object program from said main memory when the execution thereof has been finished while preserving the program structure file.

2. The method according to claim 1, wherein:

each of said program generating step and program erasing step is carried out in response to an interpretation of the program.

3. The method according to claim 1, wherein:

said auxiliary memory is a flexible disk.

4. The method according to claim 1, wherein:

said method is applied to a portable computer; and said auxiliary memory is a flexible disk.

5. A method of storing program data in an auxiliary memory, associated with a portable computer having a main memory, said method comprising the steps of:

storing condition data in an auxiliary memory, the condition data comprising at least some source code information required for generating a complete program;

generating a program structure file (TEST.FRD) in accordance with source code information in the condition data, the program structure file (TEST.FRD) defining the structure of said complete program to be generated;

selecting a form of said complete program;

generating a program file (TEST.HCM), which is said complete program, in accordance with the program structure file (TEST.FRD), said complete program being stored in said main memory;

executing the program file (TEST.HCM); and deleting the program file (TEST.HCM); from said main memory when the execution thereof has been finished while preserving the program structure file (TEST.FRD).

6. The method according to claim 1, wherein said program structure file comprises items to be processed, column width of each item within which output data thereof are indicated, type of letters of each item with which output data thereof are indicated, and decimal point information of each item.

7. The method according to claim 5, wherein:

said form of the complete program is selected from a group consisting of an intermediate code and an ASCII code.

8. A method of storing program data in an external storage, comprising the steps of:

storing condition data in the external memory, the condition data comprising at least some source code information to be used for generating a complete program;

generating a program structure file (TEST.FRD) in accordance with te source code information in said condition data, the program structure file (TEST.FRD) comprising items to be processed including column width of each item within which output data thereof are indicated, type of letters of each item with which output data thereof are indicated, and decimal point information relative to each item to define the structure of said complete program to be generated;

generating a program file (TEST*.HCM) which is said complete program in accordance with the program structure file (TEST.FRD), storing said complete program in a main memory of a computer;

causing said computer to execute the program file (TEST.*HCM) in said main memory; and deleting the program file (TEST*.HCM) from said main memory when the execution thereof has been finished while preserving the program structure file (TEST.FRD).

9. A method of increasing a main memory capacity for a computer, said method comprising the step of:

(a) storing a first part of a program in a main memory within a computer;

(b) storing a second part of a program in a separate auxiliary memory which may be temporarily associated with said computer;

(c) transferring said first part of said in said main memory program to said auxiliary memory while said auxiliary memory is temporarily associated with said computer;

(d) preparing an execution program by assembling said first and second parts of said programs of step (a) and (b) in said auxiliary memory including the substep of generating a program structure file in accordance with said second part of a program in said auxiliary memory;

(e) transferring said execution program of step (d) to the main memory in said computer;

(f) using said execution program to control said computer; and (g) erasing said execution program from said main memory while preserving said program structure file in said auxiliary memory after said step (f) of said computer is completed, thereby freeing said main memory for a future use responsive to another auxiliary memory association with said computer in steps (b) and (c).

* * * * *